(12) United States Patent
Dins et al.

(10) Patent No.: US 11,741,702 B2
(45) Date of Patent: Aug. 29, 2023

(54) AUTOMATIC SAFE-LANDING-SITE SELECTION FOR UNMANNED AERIAL SYSTEMS

(71) Applicant: Honeywell International Inc., Charlotte, NC (US)

(72) Inventors: Carl Arthur Dins, Phoenix, AZ (US); Alberto Speranzon, Maple Grove, MN (US); Vijay Venkataraman, Excelsior, MN (US); Juan Hu, Shanghai (CN); Zhiyong Dai, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 203 days.

(21) Appl. No.: 17/076,579

(22) Filed: Oct. 21, 2020

(65) Prior Publication Data

US 2022/0121836 A1 Apr. 21, 2022

(51) Int. Cl.
*G06T 7/55* (2017.01)
*G06T 7/73* (2017.01)
(Continued)

(52) U.S. Cl.
CPC ............ *G06V 20/13* (2022.01); *G01S 13/89* (2013.01); *G01S 17/89* (2013.01); *G05D 1/106* (2019.05);
(Continued)

(58) Field of Classification Search
CPC ......................... G06T 7/73; G06T 7/55; G06T 2207/30181; G06T 2207/20084; G06T 2207/10044;
(Continued)

(56) References Cited

U.S. PATENT DOCUMENTS 9,478,141 B2 10/2016 Revell et al.
9,613,538 B1 4/2017 Poole et al.
(Continued)

FOREIGN PATENT DOCUMENTS

CN 107444665 A 12/2017
CN 107748895 A 3/2018
EP 2884305 A1 6/2015

OTHER PUBLICATIONS

Yamashita, Tetsuo, et al. "Autonomous Flight of Unmanned Multicopter Using Super Wide-Angle Stereo Vision System." ICAS, 2018. (Year: 2018).*

(Continued)

*Primary Examiner* — Vu Le
*Assistant Examiner* — Tracy Mangialaschi
(74) *Attorney, Agent, or Firm* — Shumaker & Sieffert, P.A.

(57) ABSTRACT

An unmanned aerial vehicle (UAV) navigation system is configured to automatically identify a suitable UAV landing site, for example, in forced-landing (e.g., emergency) scenarios. In some examples, the system receives two or more overlapping images depicting a landscape underneath an airborne unmanned aerial vehicle (UAV); generates, based on the two or more overlapping images, a depth map for the landscape; identifies, based on the depth map, regions of the landscape having a depth variance below a threshold value; determines, for each of the regions of the landscape having a depth variance below the threshold value, a landing zone quality score indicative of the depth variance and a semantic type of the region of the landscape; identifies, based on the landing zone quality scores, a suitable location for landing the UAV; and causes the UAV to automatically navigate toward and land on the suitable location.

17 Claims, 4 Drawing Sheets

(51) Int. Cl.
  *G05D 1/10* (2006.01)
  *G01S 13/89* (2006.01)
  *G01S 17/89* (2020.01)
  *G06V 20/13* (2022.01)

(52) U.S. Cl.
  CPC .................. *G06T 7/55* (2017.01); *G06T 7/73* (2017.01); *G06T 2207/10044* (2013.01); *G06T 2207/20081* (2013.01); *G06T 2207/20084* (2013.01); *G06T 2207/30181* (2013.01)

(58) Field of Classification Search
  CPC .......... G06T 2207/20081; G06V 20/13; G08G 5/0086; G08G 5/0069; G08G 5/025; G08G 5/0021; G08G 5/0056; G05D 1/0676; G05D 1/106; G01S 13/89; G01S 17/89
  See application file for complete search history.

(56) References Cited

U.S. PATENT DOCUMENTS

| | | | |
|---|---|---|---|
| 2015/0170526 A1* | 6/2015 | Wang | G01S 17/88 701/16 |
| 2017/0197729 A1* | 7/2017 | Derenick | G06V 20/176 |
| 2019/0248487 A1* | 8/2019 | Holtz | G06V 10/82 |

OTHER PUBLICATIONS

Brockers, Roland, et al. "Computer vision for micro air vehicles." Advances in Embedded Computer Vision. Springer, Cham, 2014. 73-107. (Year: 2014).*
Extended Search Report from counterpart European Application No. 21203800.4, dated Mar. 22, 2022, 8 pp.
Mittal et al. "Vision-based Autonomous Landing in Catastrophe-Struck Environments," Arxiv.org, Sep. 15, 2018, XP080917647, 8 pp.
Response to Office Action dated Mar. 22, 2022, from counterpart European Application No. 21203800.4, filed May 23, 2022, 18 pp.
"Daedalean—Autonomous piloting systems for aircraft of today and tomorrow," retrieved from https://www.daedalean.ai/, on Sep. 30, 2020, 4 pp.
YouTube, "Magpie and AirRails: Daedalean & UAVenture teaser," retrieved from https://www.youtube.com/watch?v=g05dqXqWliA, Sep. 30, 2020, 3 pp.
Zhou et al., "DeepTAM: Deep Tracking and Mapping," Proceedings of the European Conference on Computer Vision (ECCV), Aug. 2018, 17 pp.
Notice of Intent to Grant and Text Intended to Grant from counterpart European Application No. 21203800.4 dated Jan. 5, 2023, 9 pp.

* cited by examiner

AUTOMATIC SAFE-LANDING-SITE SELECTION FOR UNMANNED AERIAL SYSTEMS

TECHNICAL FIELD

This disclosure relates to unmanned aerial vehicles (UAVs).

BACKGROUND

A human pilot may remotely control an unmanned aerial vehicle (UAV). In some examples, a UAV may include one or more onboard navigation systems in order to automatically conduct semi-autonomous or fully autonomous flight segments. For example, a UAV may include a GPS-based navigation system or a visual-based (e.g., image-processing-based) navigation system.

SUMMARY

In general, this disclosure relates to systems and techniques for automatically identifying a suitable landing location for an unmanned aerial vehicle (UAV) and automatically navigating the UAV toward the suitable landing location. The techniques of this disclosure may be used as a primary UAV navigation system or a backup navigation system, such as for when the UAV's conventional navigation systems become compromised. In some examples, the navigation system may be configured to capture two or more images of a landscape underneath the UAV and generate a "depth" map indicating, for each pixel in at least one of the images, a relative distance between the pixel and the UAV. The navigation system may then identify, based on the depth map, one or more generally flat or planar regions of the landscape. The navigation system may then generate a landing zone "quality" score for each of the generally flat or planar regions of the landscape. For example, the navigation system may include one or more machine-learning-based, neural-net-based, or artificial-intelligence-based models or algorithms trained to rate or rank each region of the landscape based on its suitability for landing (e.g., based on ground-surface type, nearby traffic, etc.). Upon identifying a particular suitable region (e.g., the region having the highest landing zone quality score, or the nearest region having an above-threshold landing zone quality score), the navigation system may cause the UAV to automatically navigate toward and land on the identified region.

In one example, this disclosure describes a method including receiving two or more overlapping images depicting a landscape underneath an airborne unmanned aerial vehicle (UAV); generating, based on the two or more overlapping images, a depth map for the landscape; identifying, based on the depth map, regions of the landscape having a depth variance below a threshold value; determining, for each of the regions of the landscape having a depth variance below the threshold value, a landing zone quality score indicative of the depth variance and a semantic type of the region of the landscape; identifying, based on the landing zone quality scores, a suitable location for landing the UAV; and causing the UAV to automatically navigate toward and land on the suitable location.

In another example, this disclosure describes an unmanned aerial vehicle (UAV) navigation system including an unmanned aerial vehicle (UAV); an image-capture device coupled to the UAV; and processing circuitry coupled to the UAV, and configured to: receive, from the image-capture device, two or more overlapping images depicting a landscape underneath the UAV; generate, based on the two or more overlapping images, a depth map for the landscape; identify, based on the depth map, regions of the landscape having a depth variance below a threshold value; determine, for each of the regions of the landscape having a depth variance below the threshold value, a landing zone quality score indicative of the depth variance and a semantic type of the region of the landscape; identify, based on the landing zone quality scores, a suitable location for landing the UAV; and cause the UAV to automatically navigate toward and land on the suitable location.

In another example, this disclosure describes a non-transitory, computer readable medium including instructions that, when executed by a processor, cause the processor to: receive, from an image-capture device, two or more overlapping images depicting a landscape underneath a UAV; generate, based on the two or more overlapping images, a depth map for the landscape; identify, based on the depth map, regions of the landscape having a depth variance below a threshold value; determine, for each of the regions of the landscape having a depth variance below the threshold value, a landing zone quality score indicative of the depth variance and a semantic type of the region of the landscape; identify, based on the landing zone quality scores, a suitable location for landing the UAV; and cause the UAV to automatically navigate toward and land on the suitable location.

The details of one or more examples of the disclosure are set forth in the accompanying drawings and the description below. Other features, objects, and advantages will be apparent from the description, drawings, and claims.

DETAILED DESCRIPTION

In general, this disclosure relates to systems and techniques for automatically identifying a suitable landing location for an unmanned aerial vehicle (UAV) and automatically navigating the UAV to the identified location. The techniques of this disclosure may be used as a primary UAV navigation system or a backup navigation system, such as for when the UAV's conventional navigation systems become compromised. In some examples, the navigation system may be configured to capture imagery (e.g., two or more images) of a landscape underneath the UAV and generate a depth map based on a change in relative position among corresponding (e.g., matching) pixels between the images. The system may then determine or identify, based on the depth map, one or more generally flat or planar regions of the landscape. The navigation system may then generate, for the one or more flat or planar regions of the landscape, a landing zone "quality" score, indicating a relative suitability for landing the UAV at that region. For example, the navigation system may include one or more machine-learning-based, neural-net-based, or artificial-intelligence-based models or algorithms trained to rate or rank each region of the landscape based on the suitability of each region for landing, e.g., based on a semantic "type" (e.g., ground-surface type) of each region of the landscape. Upon identifying a particular suitable region (e.g., the region having the highest landing zone quality score, or the nearest location having an above-threshold landing zone quality score), the navigation system may cause the UAV to automatically navigate toward and land on the identified region.

Figure 1:
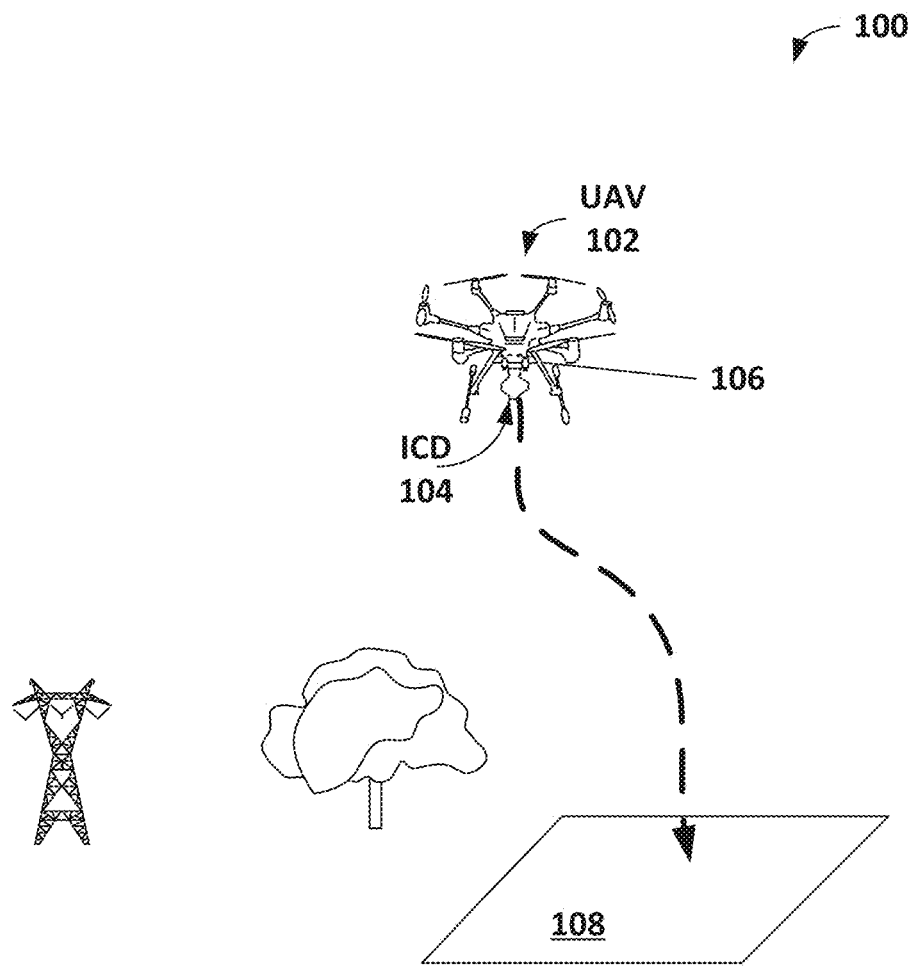
FIG. 1 is a conceptual diagram depicting an example UAV system, according to one or more techniques of this disclosure.

FIG. 1 depicts an example unmanned aerial vehicle (UAV) navigation system 100, according to techniques of this disclosure. System 100 may be included as part of a primary navigation system of UAV 102, or in other examples, may include a backup navigation system for use when one or more other UAV navigation system(s) become unavailable. As shown in FIG. 1, UAV navigation system 100 includes UAV 102, having at least one image-capture device (ICD) 104 and an integrated computing device 106.

UAV 102 may include a relatively small unmanned device capable of flight, such as via one or more rotors. UAV 102 is depicted in FIG. 1 as a hexacopter, but UAV 102 may include any type of UAV including, but not limited to, a quadcopter, a rotorcraft, a fixed-wing aircraft, compound aircraft such as tilt-rotor, X2 and X3, an aerostat, or any other such type of UAV including all vertical take-off and landing (VTOL), tail-sitter, etc. UAV 102 may be configured to fly with various degrees of autonomy. In some examples, UAV 102 may use light-detection and ranging (LIDAR) for collision avoidance. UAV 102 may, for example, be a relatively small, low altitude, and low-speed UAV, where in this context, small corresponds to under 100 lbs. (e.g., around 50 lbs.), low altitude corresponds to operating altitudes less than 3000 feet above ground (e.g., 400 feet or less), and low air speed corresponds to air speeds less than 250 knots (e.g., 10 knots) or less than 50 miles per hour (mph). Furthermore, it is contemplated that UAV 102 may have hovering capabilities, meaning UAV 102 may have the capability of remaining at an approximately constant location in the air.

In some examples, a detector or other sensing equipment may be mounted on UAV 102 to enable UAV 102 to quickly collect high-quality data in hard-to-reach locations. For example, large-scale industrial companies, such as utilities, oil, and natural gas, may own or otherwise manage a complex asset infrastructure, such as transmission towers for an electric powerline, pipelines, data (fiber-optic) cables, factories, plants, solar panels, wind turbines, or other such structures or facilities. Such infrastructure may require periodic inspections to maintain high productivity. The overseeing company (or other controlling entity, such as a governmental administrative body) may employ any of a number of different types of sensing or detection equipment to collect various types of data describing different aspects of the infrastructure. Some non-limiting examples of current sensing equipment include x-ray systems, infrared systems, sonar systems, radar detectors, optical systems, and hybrid multispectral cameras. In some examples, sensing equipment may include image-capture device 104. In other examples, sensing equipment may be distinct from image-capture device 104.

In some examples, a human or other pilot may manually control a flight path (e.g., speed, heading or direction, altitude, etc.) of UAV 102. For example, a pilot may use a controller (not shown) to wirelessly transmit signals to control the flight path of UAV 102, such as during an inspection flight segment. Additionally or alternatively, UAV 102 may include one or more internal navigation systems configured to enable UAV 102 to autonomously or semi-autonomously complete one or more flight segments. For example, UAV 10 may include a satellite-based navigation system, such as a Global Positioning System (GPS)-based navigation. In some examples, UAV 102 may include a visual-based navigation system, wherein the UAV utilizes image-capture device 104 and computing device 106 to identify distinct landmarks from within captured imagery and determine a flightpath based on the landmarks. In some examples, UAV 102 may include a passive-surveillance-based navigation system, such as the Automatic Dependent Surveillance Broadcast (ADS-B) system.

In some scenarios, one or more of the navigation system(s) of UAV 102 may be malfunctioning or otherwise unavailable. For example, due to inclement weather, equipment malfunction, terrain, or other factors, UAV 102 may lose data communication with the pilot, and/or other signals from additional navigation systems, such as a GPS signal. In one scenario, a set of infrastructure undergoing a UAV-based inspection may naturally emit a relatively strong electromagnetic signature that can interfere with a vehicle's detection equipment and/or guidance systems (such as GPS, radiofrequency, or other electromagnetic-based guidance systems).

In some examples in accordance with this disclosure, upon the occurrence of a triggering condition, UAV 102 may automatically identify and navigate toward a suitable landing site that meets certain minimum criteria (e.g., a relatively solid, flat surface). For example, a triggering condition may include computing device 106 of UAV 102 automatically detecting a loss of data communication with the UAV pilot or other navigation signal sources. In another example, a triggering condition may include computing device 106 receiving a particular input indicative of the triggering condition. For example, a user, such as a pilot of UAV 102, may activate a user-input device configured to transmit a signal to trigger an automatic-landing mode of UAV 102.

In such an event or in response to detecting the condition, UAV 102 may be configured to automatically identify and self-navigate (e.g., with minimal-to-no further human intervention) toward a suitable landing location. For example, in accordance with the techniques of this disclosure, UAV 102 is configured to cause ICD 104 to capture two or more overlapping images depicting a landscape 108 underneath the airborne UAV 102. That is, ICD 104 may capture two or more images of approximately the same landscape, with some of the two or more images being captured from slightly different locations (e.g., positions and/or orientations). The locations may, for example, be different because the images were captured from different lenses mounted at different positions on UAV 102, or may be different due to movement of UAV 102 between the capture of the different images.

Based on the two or more overlapping images, UAV 102 generates a depth map 304 (FIG. 3) for at least one of the two or more images (referred to herein as the "key frame" image) of the landscape. For example, UAV 102 may determine a change in relative positions for pairs of matching or corresponding pixels between the two or more images, and then estimate, based on the change in relative positions, a relative distance between the UAV 102 and each pixel of the key frame image. UAV 102 may store the set of estimated relative distances within a matrix, and output a "map" 304 in which a color or shade of each pixel indicates the relative distance of the pixel from the UAV.

In some examples, but not all examples, UAV 102 may identify, based on the depth map, one or more relatively flat or planar regions of the landscape. For example, UAV 102 may identify regions in which the relative depth (e.g., distance from UAV 102) remains relatively constant or consistent (e.g., defines a below-threshold depth variance). In some examples, UAV 102 divides the depth map into a plurality of smaller regions, and then determines a depth variance of each region of the landscape by determining an average variance in height for each region. In other examples, UAV 102 may determine a depth variance of each region of the landscape by determining the difference in depth between a "highest" point in the region and the "lowest" point in the region.

UAV 102 may feed the original images, the depth map (e.g., the matrix of relative distances represented by the depth map), and/or the depth variances (e.g., indications of flat or planar regions) into a landing-zone-quality module trained to assign a relative "quality" ranking to each region in the depth map. For example, the quality module may be trained to recognize (e.g., distinguish between) different semantic "types" of landscapes, such as fields, roads, bodies, of water, etc., and rank the landing-zone-quality of each region of the landscape by based on its depth variance (e.g., relative flatness) and its semantic type. UAV 102 may then select a single suitable location for landing the UAV based at least in part on the quality rankings, such as the location having the highest quality ranking, or the nearest location having an above-threshold quality ranking, and self-navigate toward and land on the suitable location.

Figure 2:
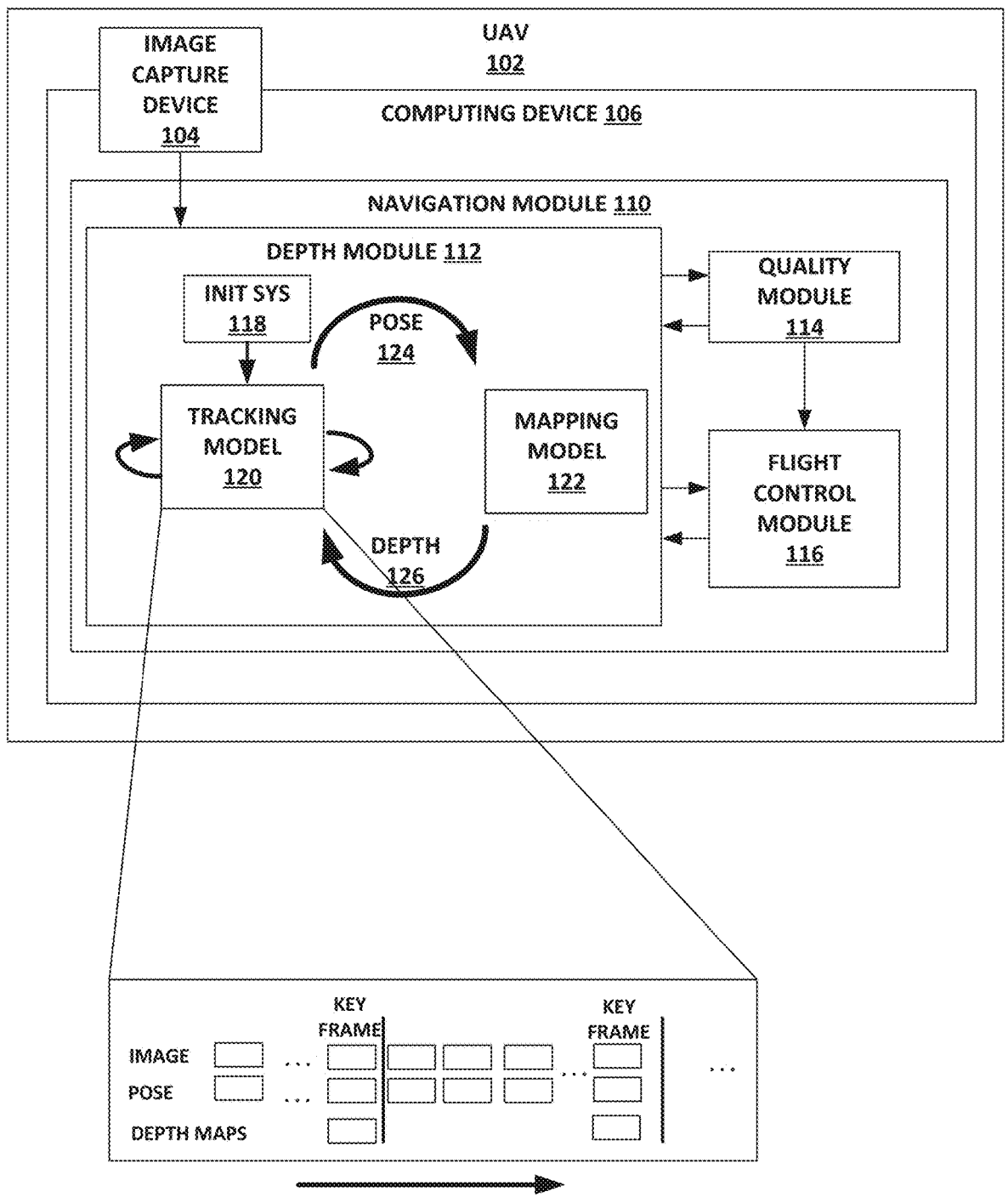
FIG. 2 is a block diagram illustrating some example components of the UAV system of FIG. 1.

FIG. 2 is a block diagram illustrating some example components of UAV 102 of FIG. 1. UAV 102 includes at least an image-capture device 104 and an integrated computing device 106. Computing device 106 may include at least processing circuitry and a computer-readable medium storing instructions that when executed by the processing circuitry, cause the processing circuitry to perform the techniques of this disclosure. In particular, memory of computing device 106 stores a navigation module 110 configured to identify a suitable landing site and cause UAV 102 to navigate toward and land on the identified landing site. More specifically, navigation module 110 includes depth module 112, quality module 114, and flight control module 116. Depth module 112 includes at least tracking model 120 and mapping model 122.

According to the techniques of this disclosure, image-capture device 104 captures two or more overlapping images 302 (FIG. 3) depicting a landscape beneath UAV 102 while UAV 102 is in flight. Image-capture device 104 may be configured to capture any suitable type of imagery 302, such as standard photographic images, radar images, or lidar images. In some examples, image-capture device 104 may be configured to automatically capture images 302 at a pre-determined frequency (e.g., 1 Hz), or in other examples, in response to receiving user input from a pilot of UAV 102 or a data scientist configured to control the data-capture processes of UAV 102. The at least two images 302 are considered to be "overlapping" in that at least one geographic region (of any arbitrary size) appears (e.g., is represented) in both images. Image capture device 104 then transmits images 302 to depth module 112 and quality module 114.

Depth module 112 receives the two or more overlapping images 302 from image-capture device 104. Based on the two or more overlapping images 302, depth module 112 generates a depth map 304 (FIG. 3) for the landscape to identify generally "flat" or "planar" regions of the landscape, e.g., regions of the landscape having a local depth variance below a threshold value. For example, depth module 112 includes tracking model 120 and mapping model 122, configured to generate depth map 304 through a feedback loop in which tracking model 120 and mapping model 122 exchange UAV pose data 124 and landscape depth data 126.

For example, tracking model 120 is configured to receive the two or more overlapping images 302, as well as initial system pose data 118. Initial system pose data 118 includes data indicative of an initial physical location (e.g., geolocation) and an initial orientation of UAV 102. Initial system pose data 118 may include data generated by a GPS unit, an inertial measurement unit (IMU), or other spatial orientation sensor of UAV 102. Initial system pose data 118 indicates a "first" pose of UAV 102, such as the initial position and orientation of UAV 102 when image capture device 104 captured the "key frame" image of the two or more images.

In some examples, initial system pose data 118 may be set to "null" values by default (e.g., x=0, y=0, z=0, roll=0, pitch=0, yaw=0), and UAV 102 may subsequently monitor a change in position and orientation away from these initial null values. In other examples, the position coordinates of initial system data 118 may correspond to GPS data of UAV 102, and the orientation coordinates of initial system data 118 may correspond to IMU (e.g., microelectromechanical (MEM) gyroscope) data of UAV 102. In some such examples, any position and/or orientation data subsequently communicated between depth module 112, quality module 114, and flight control module 116 is represented within a common coordinate frame, thereby enabling simpler communications indicative of a selected landing zone location to the flight control 116, such that flight control module 116 may then navigate UAV 102 toward the selected landing location.

Based on the "first" pose of the initial pose data 118, the first image, and the second image, tracking model 120 is configured to determine or estimate a "second" pose of UAV 102, wherein the "second" pose indicates the position and orientation (or change in position and orientation) of UAV 102 at the time at which UAV 102 captured the second image of the two or more overlapping images. For example, tracking model 120 may include a convolutional neural network (CNN), e.g., a machine-learning model, including one or more artificial-intelligence-based algorithms, trained to perform trigonometric geometry to determine, based on a change in position and orientation of the overlapping region of landscape between the two images, a corresponding or respective change in position and/or orientation of UAV 102 between the times at which image-capture device 104 captured the two images. As one non-limiting example, tracking model 120 may first be trained to identify corresponding or matching features or pixels between the two overlapping images, and then determine a relative change in position and/or orientation of the matched features or pixels between the two images. Tracking model 120 may further be trained to estimate, based on an identified change in position of the matched features, a corresponding change in position and/or orientation of the image-capture device 104 that captured the images. Based on the first pose data and the estimated change in position and/or orientation, tracking model 120 may determine the predicted "second" pose data 124.

Tracking model 120 may then transfer the first pose data 118 and second pose data 124 to mapping model 122. Mapping model 122 receives the first pose data 118, the first image, the predicted second pose data 124, and the second image, and determines, for each region of landscape (e.g., for each pixel) depicted in the first image (or at least each region or pixel of the overlapping region within the first image), a relative depth of the respective region of landscape in the first image, wherein the depth indicates a distance between the respective region and UAV 102. For example, mapping model 122 may be trained to determine (e.g., identify or measure) a relative change in position between two or more pairs of matched features or pixels between the first image and the second image (e.g., a change in position relative to each other) to estimate a relative depth of each pair of matched features or pixels. As one illustrative example, a relatively tall object, e.g., the rooftop of a building that is closer to the flight level of UAV 102, is likely to exhibit a relatively large change in position from the first image to the second image, as compared to a relatively distant region, such as a manhole cover level with a street, which is likely to appear to remain in a relatively constant position between the two or more images. In this fashion, mapping model 122 may perform these types of geometric-disparity calculations for each region or each pixel in the first image to determine a relative "depth" of the region or pixel, e.g., a relative distance of each pixel from UAV 102. Mapping model 122 may store these estimated depth values within a depth matrix. In some examples, but not all examples, mapping model 122 may visually represent the relative depth values as depth map 304 (FIG. 3), wherein a color of each pixel of depth map 304 indicates the relative distance of that pixel from UAV 102. For example, a generally flat or planar region of the landscape may visually appear as an area of depth map 304 in which the color does not abruptly change among consecutive pixels within the region.

Navigation module 110 (e.g., either depth module 112, quality module 114, or both) identifies, based on depth map 304 (e.g., the depth matrix) one or more such flat or planar regions of the landscape (e.g., regions having a below threshold depth variance). In some examples, navigation module 110 divides depth map 304 into a plurality of smaller regions, and then determines a depth variance of each region of the landscape by determining an average variance in height for all of the pixels in each region. In other examples, navigation module 110 may determine a depth variance of each region of the landscape by determining the difference in depth between a "highest" point in the region and the "lowest" point in the region. As another example, navigation module 110 may include a deep neural network (DNN) (e.g., depth module 112, quality module 114, or both) trained to identify patterns within the relative depth values of the depth matrix indicative of generally flat or planar regions among adjacent groups of pixels.

As part of the feedback loop shown in FIG. 2, in some examples, mapping model 122 is configured to feed depth map 304 (e.g., the depth matrix) back into tracking model 120 as training data in order to improve subsequent estimations of poses of UAV 102. After generating depth map 304, depth module 112 is configured to transfer depth map 304 (e.g., the depth matrix represented by depth map 304), and in some examples, indications of any identified flat or planar regions, to quality module 114.

Figure 3:
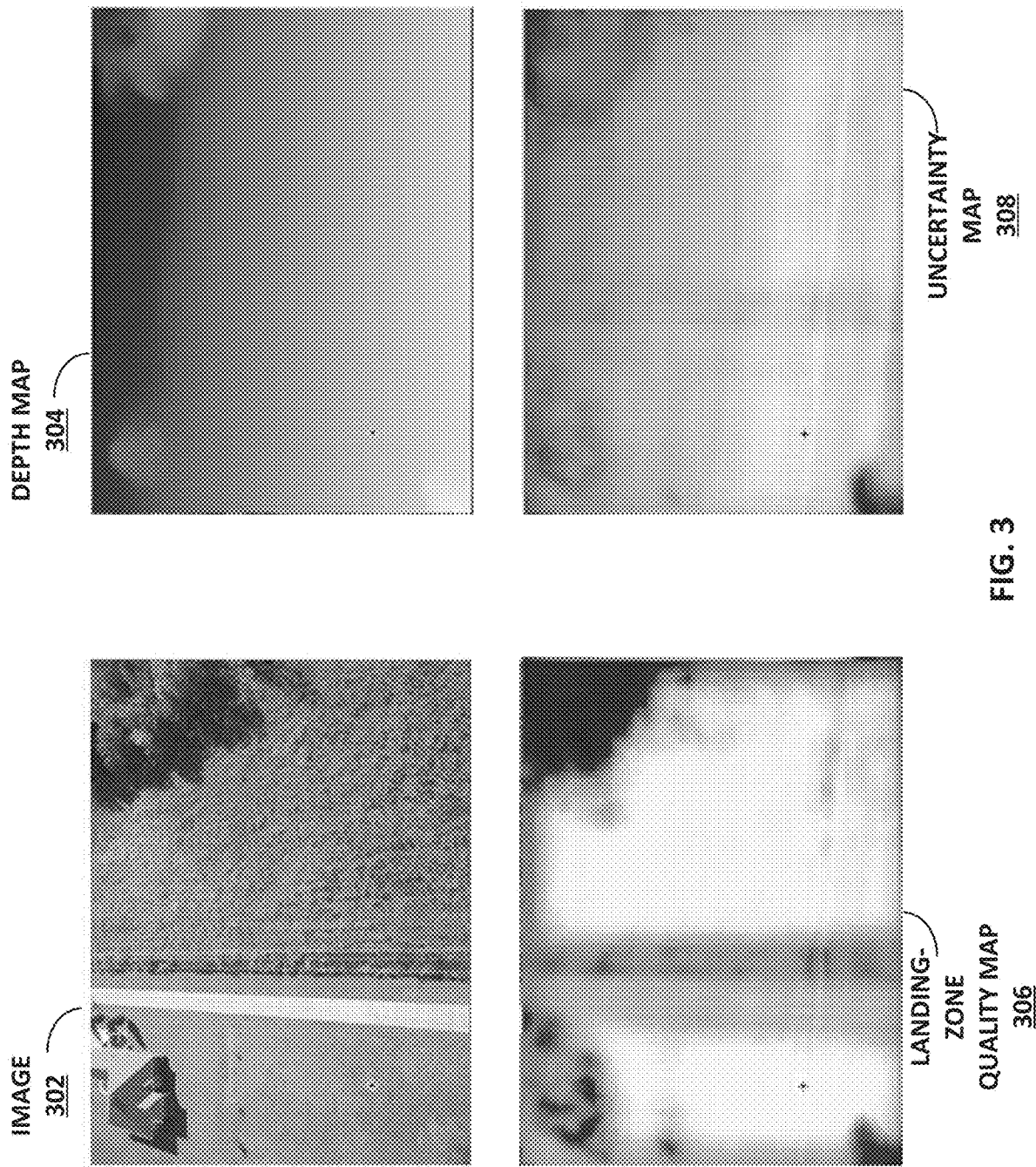
FIG. 3 is a conceptual diagram illustrating some examples of imagery that may be generated by the UAV system of FIG. 1.

Quality module 114 receives landscape images 302 from image capture device 104, depth map 304 from depth module 112, and in some examples, indications of identified planar regions. Quality module 114 is configured to generate, based at least on the original landscape imagery 302 and depth map 304, a landing zone quality map 306 (FIG. 3). For example, based on the depth map 304 and/or the identified flat or planar regions, quality module 114 further determines and assigns, for each region of the landscape, a relative "landing zone quality value" and generates a graphical representation of the landing zone quality values as landing zone quality map 306. For example, landing zone quality map 306 depicts a visual representation of all of the landing zone quality values relative as a function of their geographic location relative to one another. In some examples, but not all examples, quality module 114 includes a neural network (e.g., one or more artificial intelligence or machine-learning algorithms or models) trained to identify "suitable" regions of the landscape 108 for landing UAV 102. For example, quality module 114 may be trained, via semantic segmentation, to identify (e.g., distinguish between) a plurality of different semantic meanings, types, or categories of landscapes, based on any or all of visual patterns, textures, colors, shapes, or any other identifiable content within landscape images 302.

As one non-limiting, illustrative example, a grassy field and a body of water may both have similar depth variances, e.g., both types of landscape features may include relatively planar surfaces. However, a body of water would not typically be considered a "suitable" location for landing UAV 102, as UAV 102 may sink while attempting to land on a body of water and become irretrievable, and/or the water may damage the electronic components of UAV 102. Accordingly, although navigation module 110 may have identified both the field region and the body-of-water region as being relatively flat or planar regions, quality module 114 may subsequently identify different semantic meanings for the two regions, and based on the semantic meanings, assign a relatively high landing-zone-quality value to the field region and a substantially lower score or value to the body-of-water region within the landing zone quality map 306. Similarly, the roof of a building may be another example of a location from which it may be difficult to retrieve UAV 102. Accordingly, quality module 114 may be trained to assign a relatively low quality score to rooftops, roads, and other similar undesirable obstacles.

In some examples, but not all examples, navigation module 110 (e.g., either or both of depth module 112 and/or quality module 114) may be configured to generate an uncertainty map 308 (FIG. 3) indicative of a relative confidence in each region of the landing-zone-quality map 306, e.g., a relative certainty that any identified "suitable" landing sites (e.g., landscape regions having above-threshold landing-zone-quality scores) are relatively flat (e.g., having a below-threshold depth variance), are free of obstacles, and are composed of a suitable "type" of landscape to land on (e.g., a substantially solid, legally permissible, and low-traffic surface).

Navigation module 110 then identifies or selects, based on the depth map 304, the landing zone quality map 306, and/or the uncertainty map 308, at least one suitable location on landscape 108 (FIG. 1) for landing UAV 102. For example, the suitable location may include a region having the highest landing-zone-quality score, as determined by quality module 114. In another example, navigation module 110 may determine the suitable location for landing UAV 102 as a weighted average of high landing-zone-quality scores and proximity to a current location of UAV 102. In another example, navigation module 110 may be configured to identify one or more pre-determined, pre-defined, or "designated" suitable landing sites from within the landing-zone quality map 306. In another example, the selected suitable location may include the nearest suitable location, e.g., the nearest location having an above-threshold landing quality score. In another example, navigation module 110 may be configured to select a suitable location within predetermined interval along a most-recent flightpath of UAV 102, allowing the pilot or other user of UAV 102 to more-easily retrieve the landed device.

Upon determining a suitable location for landing UAV 102, flight control module 116 causes UAV 102 to automatically navigate toward and land on the suitable location 108. For example, flight control module 116 may determine (e.g., estimate), based on the second pose data (e.g., a "current" or most-recent location and orientation of UAV 102) and the depth map, a change in pose (e.g., a change in position and orientation) between the second pose and the identified suitable landing site. UAV 102 may be configured to periodically update its estimations of the required change in pose as it approaches the landing site.

Figure 4:
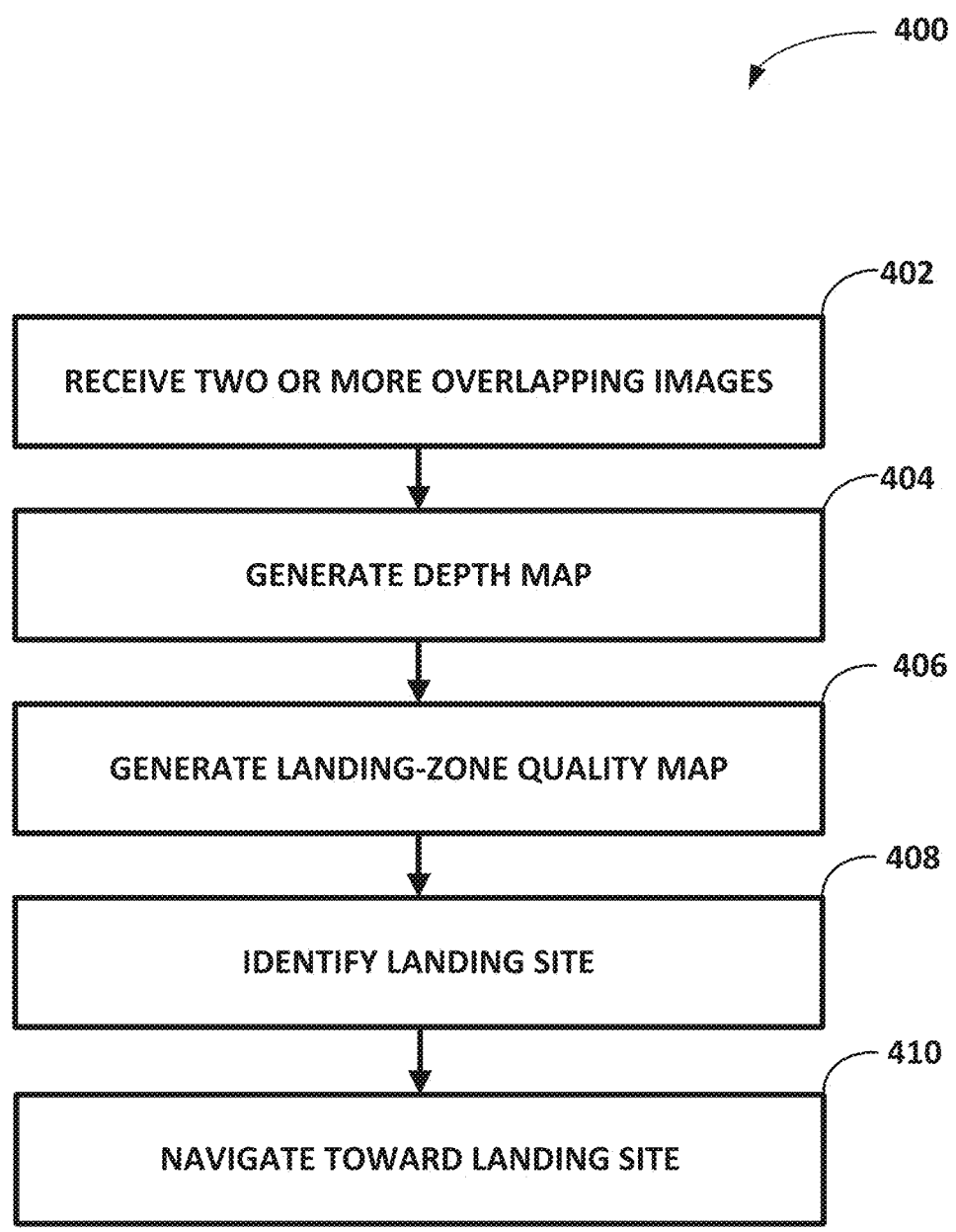
FIG. 4 is a flowchart illustrating example operations of a UAV system, in accordance with a technique of this disclosure.

FIG. 4 is a flowchart illustrating example operations of a UAV navigation system, in accordance with a technique of this disclosure. The steps of operation 400 are described with respect to UAV system 100 of FIGS. 1 and 2, however, the techniques may be performed by any capable system. UAV 102 is configured to capture or receive two or more overlapping images depicting a landscape underneath UAV 102 while UAV 102 is in flight (402). Based at least in part on the two or more images, UAV 102 generates a depth map indicating a relative depth of each region (e.g., each pixel) of the landscape depicted in a key frame image (e.g., either the first image, the second image, or both) (404). For example, UAV 102 may include a computing device configured to run one or more machine-learning algorithms or neural networks trained to estimate a change in position of UAV 102 as UAV 102 moved while capturing the two or more images. Based on the change in position and any matched featured or pixels between the two images, the neural network may be trained to estimate a relative depth or distance between each of the pixels and UAV 102.

UAV 102 may then generate a landing-zone quality map for the key frame image (e.g., the first image, the second, image, or both) (406). For example, UAV 102 may be trained to identify different semantic segmentations or meanings, indicating different types of landscapes, or in some examples, a simple binary designation of "good" types of landscapes or "bad" types of landscapes, relative to the suitability of the type of the landscape for landing a UAV. As one illustrative example, UAV 102 may include one or more machine-learning algorithms trained to identify and designate bodies of water as "bad" types of landscapes, and open fields as "good" types of landscapes, for landing UAV 102.

Based on the depth map and the landing-zone-quality map, UAV 102 may select a suitable landing location for UAV 102 (408), such as by identifying a location having the highest landing-zone-quality score as indicated by the landing-zone-quality map, or by identifying the nearest location having an above-threshold landing-zone quality score. After identifying a single suitable landing location, UAV 102 is configured to automatically self-navigate and land on the identified landing location (410).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Cloud technology used to automatically save the images on web server is not limited to local or global internet cloud. It can be a private and/or public cloud which is protected by the user ID and passwords. The passwords may not limit to one or two.

Various examples have been described. These and other examples are within the scope of the following claims.

What is claimed is:

1. A method comprising:
receiving two or more overlapping images depicting a landscape underneath an airborne unmanned aerial vehicle (UAV);
generating, based on the two or more overlapping images, a depth map for the landscape;
identifying, based on the depth map, regions of the landscape having a depth variance below a threshold value by inputting the depth map into a deep neural network (DNN) trained to identify one or more patterns within depth values of the depth map indicative of one or more planar regions in the depth map;
determining, for each of the regions of the landscape having a depth variance below the threshold value, a landing zone quality score indicative of the depth variance and a semantic type of the region of the landscape;
adjusting, for the each of the regions of the landscape, the determined landing zone quality scores based on the determined semantic type of the region;
identifying, based on the adjusted landing zone quality scores, a suitable location for landing the UAV; and
causing the UAV to automatically navigate toward and land on the suitable location.

2. The method of claim 1, wherein generating the depth map comprises:
predicting, based on a first pose of the UAV, a first image of the two or more overlapping images captured at the first pose of the UAV, and a second image of the two or more overlapping images, a second pose of the UAV; and
determining, based on the first pose, the first image, the second pose, and the second image, a depth of the landscape depicted in the first image.

3. The method of claim 2,
wherein predicting the second pose of the UAV comprises feeding the first pose, the first image, and the second image into a neural network trained to estimate the second pose, and wherein the method further comprises feeding the depth map back into the neural network as training data to improve subsequent pose estimations.

4. The method of claim 2, wherein the first pose comprises a first translation of the UAV and a first orientation of the UAV, and wherein the second pose of the UAV comprises a second translation of the UAV and a second orientation of the UAV.

5. The method of claim 4, wherein causing the UAV to navigate toward the suitable location comprises determining, based on the second translation and the second orientation and the depth map, a change in translation, a change in orientation, and a change in height between the second pose and the suitable region of the landscape.

6. The method of claim 1, further comprising causing an image-capture device of the UAV to capture the two or more overlapping images at a frequency of about 1 Hertz.

7. The method of claim 1, wherein the suitable location for landing the UAV comprises:
a pre-determined landing location;
a region having a highest landing zone quality score;
a nearest location having an above-threshold landing zone quality score; or
a suitable location identified over a predetermined interval from a most-recent flightpath of the UAV.

8. The method of claim 1, wherein identifying, based on the adjusted landing zone quality scores, the suitable location for landing the UAV comprises:
generating, based on the adjusted landing zone quality scores, a landing zone score map and an uncertainty map; and
identifying, based on the landing zone quality score map and the uncertainty map, the suitable location.

9. A system comprising:
an unmanned aerial vehicle (UAV);
an image-capture device coupled to the UAV; and
processing circuitry coupled to the UAV, and configured to:
receive, from the image-capture device, two or more overlapping images depicting a landscape underneath the UAV;
generate, based on the two or more overlapping images, a depth map for the landscape;
identify, based on the depth map, regions of the landscape having a depth variance below a threshold value by inputting the depth map into a deep neural network (DNN) trained to identify one or more patterns within depth values of the depth map indicative of one or more planar regions in the depth map;
determine, for each of the regions of the landscape having a depth variance below the threshold value, a landing zone quality score indicative of the depth variance and a semantic type of the region of the landscape;
adjust, for the each of the regions of the landscape, the landing zone quality score based on the determined semantic type of the region of the landscape;
identify, based on the adjusted landing zone quality scores, a suitable location for landing the UAV; and
cause the UAV to automatically navigate toward and land on the suitable location.

10. The system of claim 9, wherein generating the depth map comprises:
predicting, based on a first pose of the UAV, a first image of the two or more overlapping images captured at the first pose of the UAV, and a second image of the two or more overlapping images, a second pose of the UAV; and
determining, based on the first pose, the first image, the second pose, and the second image, a depth of the landscape depicted in the first image.

11. The system of claim 10, wherein predicting the second pose of the UAV comprises feeding the first pose, the first image, and the second image into a neural network trained to estimate the second pose, and wherein the processing circuitry is further configured to feed the depth map back into the neural network as training data to improve subsequent pose estimations.

12. The system of claim 10, wherein the first pose comprises a first translation of the UAV and a first orientation of the UAV, and wherein the second pose of the UAV comprises a second translation of the UAV and a second orientation of the UAV.

13. The system of claim 12, wherein causing the UAV to navigate toward the suitable location comprises determining, based on the second translation and the second orientation and the depth map, a change in translation, a change in orientation, and a change in height between the second pose and the suitable region of the landscape.

14. The system of claim 9, further comprising causing the image-capture device coupled to the UAV to capture the two or more overlapping images at a frequency of about 1 Hertz.

15. The system of claim 9, wherein the suitable location for landing the UAV comprises:
- a pre-determined landing location;
- a region having a highest landing zone quality score;
- a nearest location having an above-threshold landing zone quality score; or
- a suitable location identified over a predetermined interval from a most-recent flightpath of the UAV.

16. The system of claim 9, wherein to identify, based on the adjusted landing zone quality scores, the suitable location, the processing circuitry is configured to:
- generate, based on the adjusted landing zone quality scores, a landing zone score map and an uncertainty map; and
- identify, based on the landing zone quality score map and the uncertainty map, the suitable location.

17. A non-transitory, computer readable medium comprising instructions that, when executed by a processor, cause the processor to:
- receive, from an image-capture device, two or more overlapping images depicting a landscape underneath an unmanned aerial vehicle (UAV);
- generate, based on the two or more overlapping images, a depth map for the landscape;
- identify, based on the depth map, regions of the landscape having a depth variance below a threshold value by inputting the depth map into a deep neural network (DNN) trained to identify one or more patterns within depth values of the depth map indicative of one or more planar regions in the depth map;
- determine, for each of the regions of the landscape having a depth variance below the threshold value, a landing zone quality score indicative of the depth variance and a semantic type of the region of the landscape;
- adjust, for the each of the regions of the landscape, the landing zone quality score based on the determined semantic type of the region;
- identify, based on the adjusted landing zone quality scores, a suitable location for landing the UAV; and
- cause the UAV to automatically navigate toward and land on the suitable location.

\* \* \* \* \*